US008560374B2

(12) United States Patent
Bateni et al.

(10) Patent No.: US 8,560,374 B2
(45) Date of Patent: *Oct. 15, 2013

(54) METHOD FOR DETERMINING DAILY WEIGHTING FACTORS FOR USE IN FORECASTING DAILY PRODUCT SALES

(75) Inventors: Arash Bateni, Toronto (CA); Edward Kim, Toronto (CA)

(73) Assignee: Teradata US, Inc., Dayton, OH (US)

(*) Notice: Subject to any disclaimer, the term of this patent is extended or adjusted under 35 U.S.C. 154(b) by 776 days.

This patent is subject to a terminal disclaimer.

(21) Appl. No.: 12/326,145

(22) Filed: Dec. 2, 2008

(65) Prior Publication Data
US 2010/0138274 A1 Jun. 3, 2010

(51) Int. Cl.
*G06Q 30/02* (2012.01)
(52) U.S. Cl.
CPC .................................. *G06Q 30/02* (2013.01)
USPC ........................................................ 705/7.31
(58) Field of Classification Search
CPC ................................................ G06Q 30/0202
USPC ........................................................ 705/7.31
See application file for complete search history.

(56) References Cited

U.S. PATENT DOCUMENTS

| | | | | |
|---|---|---|---|---|
| 6,151,582 A | * | 11/2000 | Huang et al. | 705/7.25 |
| 6,415,195 B1 | * | 7/2002 | Gleditsch et al. | 700/99 |
| 7,155,402 B1 | * | 12/2006 | Dvorak | 705/14.41 |
| 7,340,410 B1 | * | 3/2008 | Vaillancourt et al. | 705/7.15 |
| 7,457,766 B1 | * | 11/2008 | Noble et al. | 705/7.31 |
| 7,552,066 B1 | * | 6/2009 | Landvater | 705/7.25 |
| 2002/0169657 A1 | * | 11/2002 | Singh et al. | 705/10 |
| 2005/0075920 A1 | * | 4/2005 | Li et al. | 705/10 |

OTHER PUBLICATIONS

Mark Dekker, Karel van Donselaar, Pim Ouwehand, How to use aggregation and combined forecasting to improve seasonal demand forecasts, Int. J. Production Economics, Elsevier, 2004, http://www.sciencedirect.com/science/article/pii/S0925527304000398.*

* cited by examiner

*Primary Examiner* — Romain Jeanty
*Assistant Examiner* — Kurtis Gills
(74) *Attorney, Agent, or Firm* — James Stover

(57) ABSTRACT

A product demand forecasting methodology is presented that applies daily weight values to a weekly forecast to determine daily forecasts for a product or service. The method determines daily weight values for use in forecasting current product sales by blending daily weight values calculated from historical demand data for both recent weeks and year-prior weeks. Recent weeks are used to account for recent correlations and alternation effects, and year-prior weeks are used to account for seasonality effects. The method automatically calculates a measure of significance for the daily weights calculated from the recent weeks and year-prior weeks. The significance of each week is applied as a weighting factor during the blending of recent weeks and year-prior daily weight values.

4 Claims, 3 Drawing Sheets

METHOD FOR DETERMINING DAILY WEIGHTING FACTORS FOR USE IN FORECASTING DAILY PRODUCT SALES

CROSS REFERENCE TO RELATED APPLICATIONS

This application is related to the following co-pending and commonly-assigned patent applications, which are incorporated by reference herein:

Application Ser. No. 10/702,963, entitled "METHODS AND SYSTEMS FOR DETERMINING DAILY WEIGHTING FACTORS FOR USE IN FORECASTING DAILY PRODUCT SALES," by Mardie Noble, Pat McDaid and Jean-Philippe Vorsanger; filed on Nov. 6, 2003; and Application Ser. No. 10/703,011, entitled "METHODS AND SYSTEMS FOR FORECASTING DAILY PRODUCT SALES," by Mardie Noble, Ejaz Haider and Shireengul Islam; filed on Nov. 6, 2003.

FIELD OF THE INVENTION

The present invention relates to methods and systems for forecasting product demand for retail operations, and in particular to the determination of daily sales patterns for products and the use of daily sales patterns in forecasting product sales and implementing product promotions.

BACKGROUND OF THE INVENTION

Accurately determining demand forecasts for products are paramount concerns for retail organizations. Demand forecasts are used for inventory control, purchase planning, work force planning, and other planning needs of organizations. Inaccurate demand forecasts can result in shortages of inventory that are needed to meet current demand, which can result in lost sales and revenues for the organizations. Conversely, inventory that exceeds a current demand can adversely impact the profits of an organization. Excessive inventory of perishable goods may lead to a loss for those goods.

Teradata Corporation has developed a suite of analytical applications for the retail business, referred to as Teradata Demand Chain Management, that provides retailers with the tools they need for product demand forecasting, planning and replenishment. The Teradata Demand Chain Management solution provides a retailer with improved customer service levels and reductions in unproductive inventory, and is particularly adept at assisting a retailer forecast and plan for seasonal sales cycles. However, for many retailers the sales pattern of different products varies from day to day. Some products sell the same throughout a week while the sale of some products follows a certain pattern that, for example, might have higher sales over the weekend as compared to during the weekend. Holidays and seasons also affect the sales pattern for certain products. Before a long holiday, sales may be higher for some products, e.g., perishable goods, milk, soft drinks and other highly consumable items, because stores may be closed or shopping inconvenient for consumers. Most retailers and particularly Food and Grocery retailers need to accurately forecast daily sales in order to minimize store inventories and optimize store replenishment schedules.

The Teradata Demand Chain management solution generates product demand forecasts on a weekly basis. Daily weights (percentage sales of each day of the week) are used to decompose weekly time series forecasts into daily forecasts. For calculation of these weights, it is not sufficient to just average previous weekly daily sales patterns. It is believed that daily sales patterns changes seasonally, and that the corresponding week number from the previous year may give the best approximation of the daily weights for a current week's daily forecast. Also, more similarity may exist between alternate odd/even weeks than just the previous weeks. This may be due to government disbursements and bi-weekly pay days.

Presented below is an improved technique for calculation of future daily weights. The effects of the seasonality, odd/even weeks, and recent week sales values are automatically measured for a given dataset, and applied to the forecast of future daily weights.

DETAILED DESCRIPTION OF THE INVENTION

Figure 1:
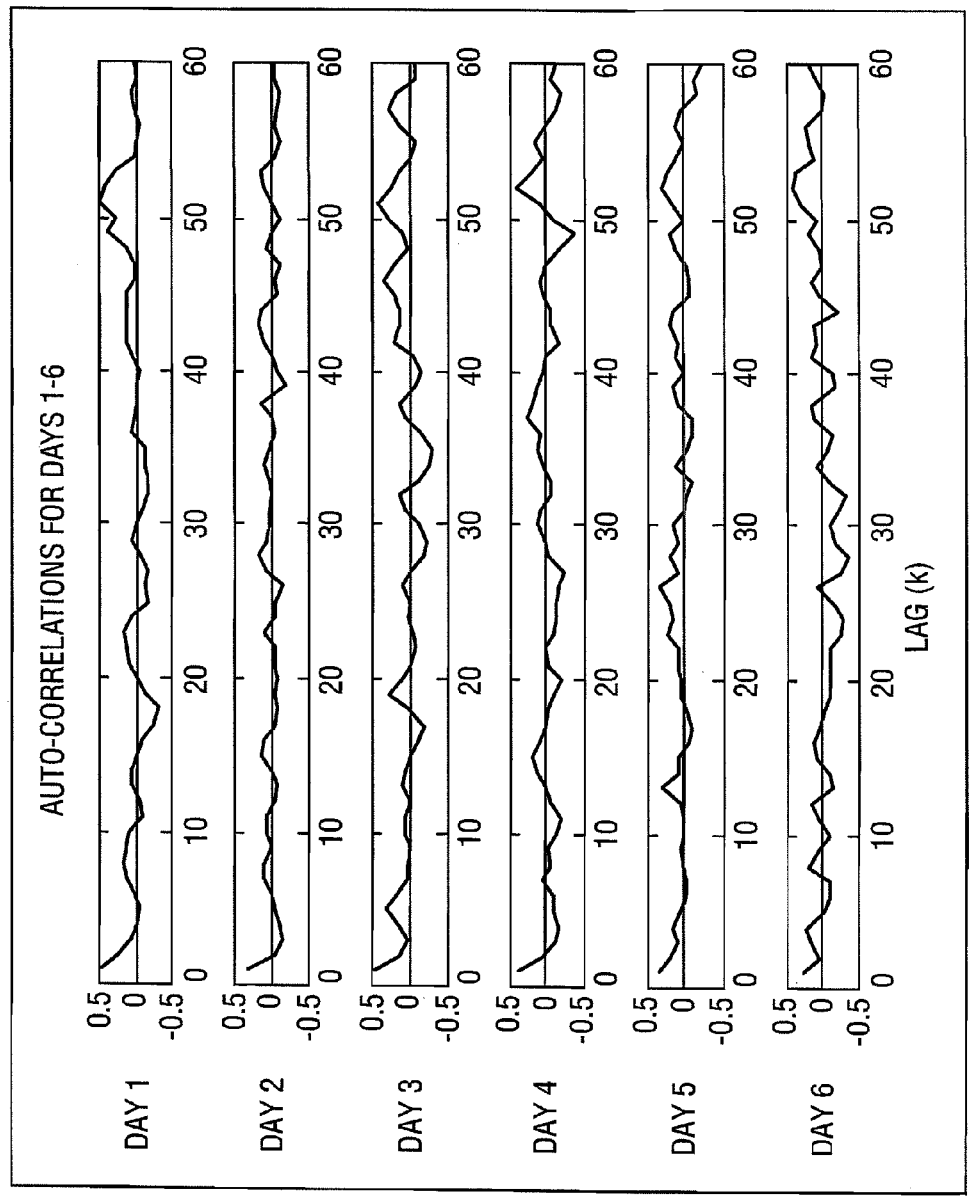
FIG. 1 provides a graph illustrating the correlation between daily weight values for individual days of a sales week and daily weight values from corresponding days in previous weeks.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

The method described below for determining daily weights for use in forecasting future product demand employs a weighted average to determine daily weights. A mathematical formulation is presented that automatically identifies the weeks of history that should be used in the averaging formula. Recent week product demand data is analyzed to account for recent correlations and alternation effects upon product demand, and corresponding prior year weekly demand data is used to account for seasonality effects Furthermore, the method described herein automatically calculates a measure of significance for the recent and prior-year demand data utilized in the forecast calculation. The significance of each week is entered as a "weight" in the average formula.

Theoretical Background

Autocorrelation coefficients are used to derive a formula for calculation of daily weights. These coefficients measure the correlation between observations at different distances apart. The distance between the observations is called lag.

In practice, autocorrelation coefficients are usually calculated by computing the series of auto-covariance coefficients, $\{C_k\}$. The auto-covariance coefficient at lag k is calculated as:

$$C_k = \frac{1}{N} \sum_{t=1}^{N-k} (x_t - \bar{x})(x_{t+k} - \bar{x}) \qquad \text{EQN 1}$$

where $x_t$ is the observation at time t, and N is the total number of observations.

Autocorrelation coefficients are then calculated as:

$$R_k = \frac{C_k}{C_0} \quad \text{EQN 2}$$

for k=1, 2, ..., m, where m<N.

The value of $R_k$ shows how strongly each observation is related to the one k time periods (weeks) earlier.

Application of Autocorrelation to Daily Weights

The autocorrelation technique is used to calculate the correlation of the daily weight of a given day of the week, e.g., Monday, to that of the same day in previous weeks. The problem reduces to finding the lags with highest autocorrelation coefficients.

Assuming that $D_{ij}$ is the demand of day j in week i, percentage daily demands or daily weights are calculated as:

$$d_{ij} = \frac{D_{ij}}{\sum_{j=1}^{6} D_{ij}} \quad \text{EQN 3}$$

Tables 1 and 2, below, provide an example of the calculation of daily weights. Table 1 shows weekly and daily demand for a product during weeks 23 through 25 in 2003. Table 2 shows the daily weights calculated from the demand data illustrated in Table 1.

TABLE 1

| yearplusweekno | Daily Demands (Dij) | | | | | | Weekly Demand |
|---|---|---|---|---|---|---|---|
| | Day 1 | Day 2 | Day 3 | Day 4 | Day 5 | Day 6 | |
| 200325 | 3305.35 | 2891.27 | 2995.33 | 3675.45 | 7686.05 | 5851.17 | 26404.62 |
| 200324 | 3513.15 | 3785.16 | 3804.29 | 3967.62 | 8109.31 | 6119.88 | 29299.42 |
| 200323 | 3572.12 | 3496.64 | 3956.46 | 4147.08 | 8254.35 | 6316.80 | 29743.44 |
| ... | ... | ... | ... | ... | ... | ... | ... |

TABLE 2

| yearplusweekno | Daily Weights (dij) | | | | | |
|---|---|---|---|---|---|---|
| | Day 1 | Day 2 | Day 3 | Day 4 | Day 5 | Day 6 |
| 200325 | 12.5% | 10.9% | 11.3% | 13.9% | 29.1% | 22.2% |
| 200324 | 12.0% | 12.9% | 13.0% | 13.5% | 27.7% | 20.9% |
| 200323 | 12.0% | 11.8% | 13.3% | 13.9% | 27.8% | 21.2% |
| ... | ... | ... | ... | ... | ... | ... |

One set of autocorrelation coefficients is then calculated for each day of the week, i.e., each column of Table 2. For example, the autocorrelations for day 2 is calculated using equations EQN 1 and EQN 2, setting $x_t = d_{t2}$ (the daily weight of day 2 at week t). Table 3 shows the resulting autocorrelation coefficients calculated for different days of a sample dataset.

TABLE 3

| Lag (k) | Day 1 | Day 2 | Day 3 | Day 4 | Day 5 | Day 6 |
|---|---|---|---|---|---|---|
| 1 | 0.45 | 0.33 | 0.45 | 0.37 | 0.34 | 0.24 |
| 2 | 0.22 | -0.03 | 0.12 | 0.06 | 0.19 | 0.03 |
| 3 | 0.06 | -0.14 | 0.04 | -0.16 | 0.09 | 0.14 |
| 4 | -0.05 | -0.10 | 0.15 | -0.16 | 0.13 | 0.23 |

TABLE 3-continued

| Lag (k) | Day 1 | Day 2 | Day 3 | Day 4 | Day 5 | Day 6 |
|---|---|---|---|---|---|---|
| 5 | -0.07 | -0.05 | 0.30 | -0.10 | 0.07 | -0.03 |
| 6 | 0.01 | 0.01 | 0.17 | -0.07 | -0.03 | -0.11 |
| 7 | 0.10 | 0.11 | 0.04 | 0.05 | -0.04 | -0.10 |
| 8 | 0.18 | 0.08 | 0.02 | -0.07 | 0.00 | 0.17 |
| 9 | 0.11 | 0.01 | -0.03 | -0.02 | 0.03 | 0.03 |
| 10 | 0.08 | 0.05 | 0.06 | -0.13 | -0.01 | -0.09 |
| 11 | -0.09 | 0.04 | 0.05 | -0.20 | 0.01 | 0.04 |
| 12 | -0.08 | -0.05 | 0.00 | -0.05 | 0.03 | 0.15 |
| ... | ... | ... | ... | ... | ... | ... |

The first row of Table 3 (lag=1) indicates how strongly the daily weights of each week are related to that of its previous week. Similarly the row k shows the correlations with the daily weights of k weeks earlier.

Strong correlations, represented by large positive values, suggest that the lags can be useful for calculation of future daily weights. A graph of autocorrelation coefficients, called correlogram, is often used to visually identify such relations. FIG. 1 provides a set of correlograms illustrating the correlation between daily weight values for individual days of a sales week, DAY 1 through DAY 6, and daily weight values from corresponding days in previous weeks.

The results illustrated in Table 3 are summarized by calculating the mean and standard deviation of the autocorrelation coefficients over all days of the week, i.e., over each row of Table 3. Table 4 shows the resulting autocorrelation coefficients calculated for different days of a sample dataset. Table 4 shows the mean and standard deviation of the autocorrelation coefficients of Table 3.

TABLE 4

| Lag (k) | Mean | STD |
|---|---|---|
| 1 | 0.364072 | 0.078488 |
| 2 | 0.10084 | 0.095865 |
| 3 | 0.003595 | 0.122418 |
| 4 | 0.031612 | 0.158999 |
| 5 | 0.020247 | 0.149937 |
| 6 | -0.00334 | 0.097647 |
| 7 | 0.028424 | 0.082177 |
| 8 | 0.062859 | 0.098114 |
| 9 | 0.019063 | 0.050479 |

TABLE 4-continued

| Lag (k) | Mean | STD |
|---|---|---|
| 10 | −0.00813 | 0.086255 |
| 11 | −0.02425 | 0.101826 |
| 12 | −0.00028 | 0.084716 |
| ... | ... | ... |

Figure 2:
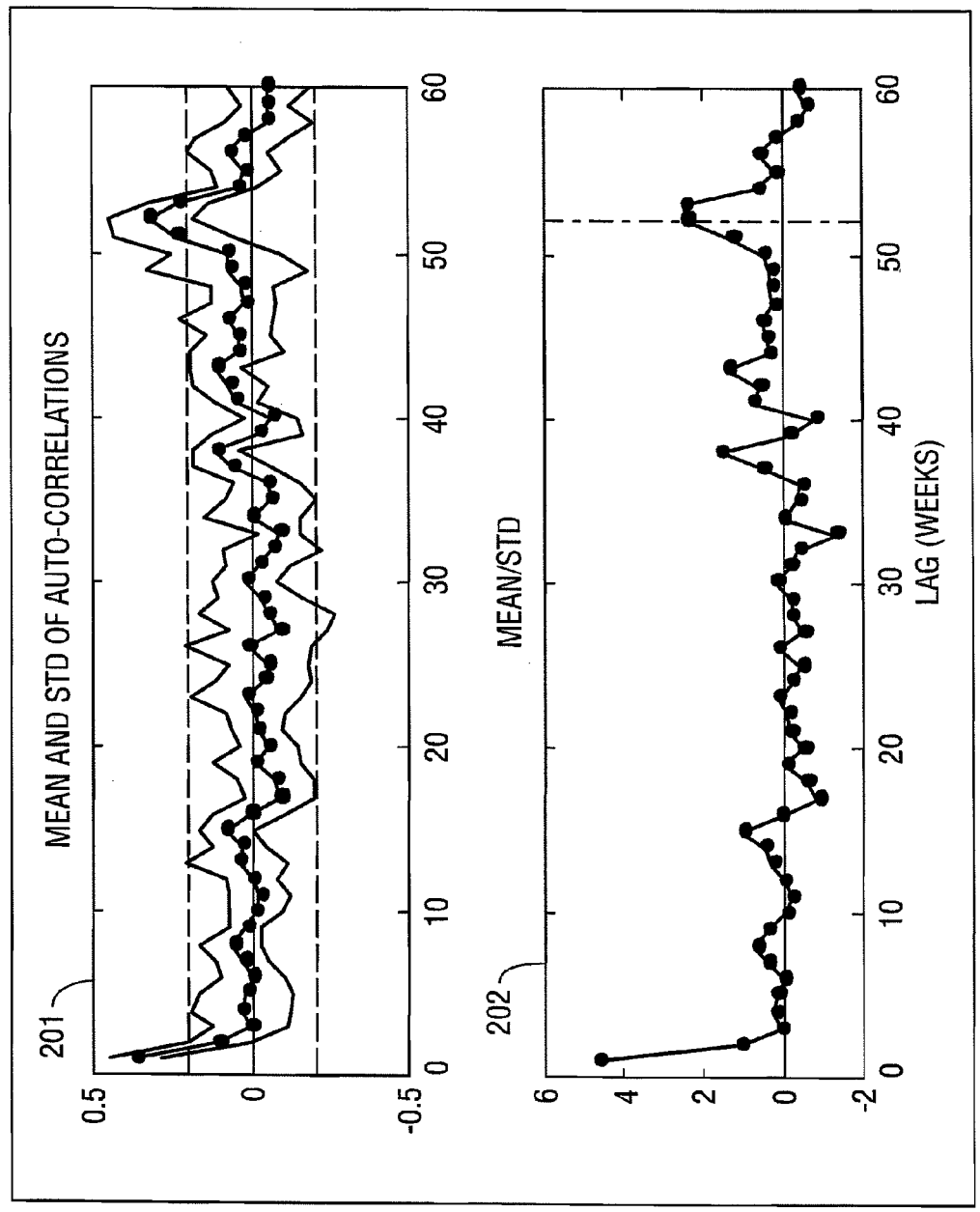
FIG. 2 provides a graph illustrating the mean and standard deviation of correlation coefficient values calculated for all days of a sales week.

FIG. 2 shows the graphical representation of the results of Table 4. In graph 201 the standard deviation was used as the upper and lower bound of the mean correlations. Normally the lags with large mean correlation and small standard deviation are preferred to be used for calculation of daily weights. Hence, as an optional step, graph 202 shows the ratio of Mean/STD, which is a useful visual tool for detection of strong correlations: the larger the ratio is, the more useful the lag is to forecast daily weights.

FIG. 2 shows two type of correlations: the correlation with the recent weeks (lags 1 and 2), and the seasonal correlation (lags 51-53). Both of the above relations were expected as mentioned earlier. The figure however does not show any significant alternation effects (e.g. effects of the odd/even weeks) for this dataset. Such an alternation would appear as alternating (positive and negative) coefficients over the lags 1-4. In brief, the above results suggest that higher weights should be given to recent and seasonal lags, when forecasting the future daily demand.

Automated Calculation of Daily Weights

Currently, future daily weights are calculated by simply averaging the weights of the preceding four weeks. However, it is known, and supported by the above analysis, that the daily weights are correlated to the corresponding weeks from the previous year, as well as the preceding weeks of the current year. Therefore, it is recommended to use data from both the preceding weeks of the current year, e.g., lags 1-4 (last four recent weeks) and corresponding data from the previous year, e.g., lags 50-53 (prior year weeks) for calculation of daily weights. It is further recommended to use a weighted average formula to put more emphasise on the weeks with highest mean auto-correlations (see Table 4). These weights are calculated as:

$$w_k = \frac{\bar{R}_k}{\bar{R}_1 + \bar{R}_2 + \bar{R}_3 + \bar{R}_4 + \bar{R}_{50} + \bar{R}_{51} + \bar{R}_{52} + \bar{R}_{53}} \quad \text{EQN 4}$$

where k=1-4 and 50-53.

The weights calculated in Equation EQN 4 should not be confused with daily weights. Daily weights represent the percentage daily demand, whereas the above (weekly) weights, $w_k$, measure the importance of the past weeks or lags for calculation of future daily weights.

Table 5, below, shows the weights, $w_k$, calculated using Equation EQN 4 for the above example. These weights are used in the weighted average formula.

TABLE 5

| Lag | Mean Autocorrelation | Weight (wk) |
|---|---|---|
| 1 | 0.36407 | 0.27002 |
| 2 | 0.10084 | 0.07479 |
| 3 | 0.00360 | 0.00267 |
| 4 | 0.03161 | 0.02345 |
| 50 | 0.07486 | 0.05552 |
| 51 | 0.23413 | 0.17365 |
| 52 | 0.31460 | 0.23333 |
| 53 | 0.22460 | 0.16658 |
| Total | 1.34832 | 1.000 |

Finally, the future daily weights are calculated using the past daily weights (Table 2) and the prior week weights (Table 5). Table 6, provided below, shows the results of the daily weight calculations for week 26 of 2003.

| Yearplusweekno | Daily Weights (dij) | | | | | | LAG (k) | Weight (wk) |
|---|---|---|---|---|---|---|---|---|
| | 1 | 2 | 3 | 4 | 5 | 6 | | |
| 200326 | 12.0% | 11.4% | 12.3% | 13.6% | 29.0% | 21.6% | ← forecast | |
| 200325 | 12.5% | 10.9% | 11.3% | 13.9% | 29.1% | 22.2% | 1 | 0.27002 |
| 200324 | 12.0% | 12.9% | 13.0% | 13.5% | 27.7% | 20.9% | 2 | 0.07479 |
| 200323 | 12.0% | 11.8% | 13.3% | 13.9% | 27.8% | 21.2% | 3 | 0.00267 |
| 200322 | 12.0% | 10.6% | 13.6% | 14.3% | 27.8% | 21.6% | 4 | 0.02345 |
| 200428 | 10.8% | 9.8% | 11.8% | 14.4% | 31.3% | 21.8% | 50 | 0.05552 |
| 200427 | 10.5% | 10.2% | 12.4% | 13.8% | 31.0% | 22.1% | 51 | 0.17365 |
| 200426 | 10.1% | 10.6% | 13.0% | 13.3% | 30.7% | 22.3% | 52 | 0.23333 |
| 200425 | 16.1% | 14.4% | 12.7% | 12.9% | 24.5% | 19.5% | 53 | 0.16658 |

Figure 3:
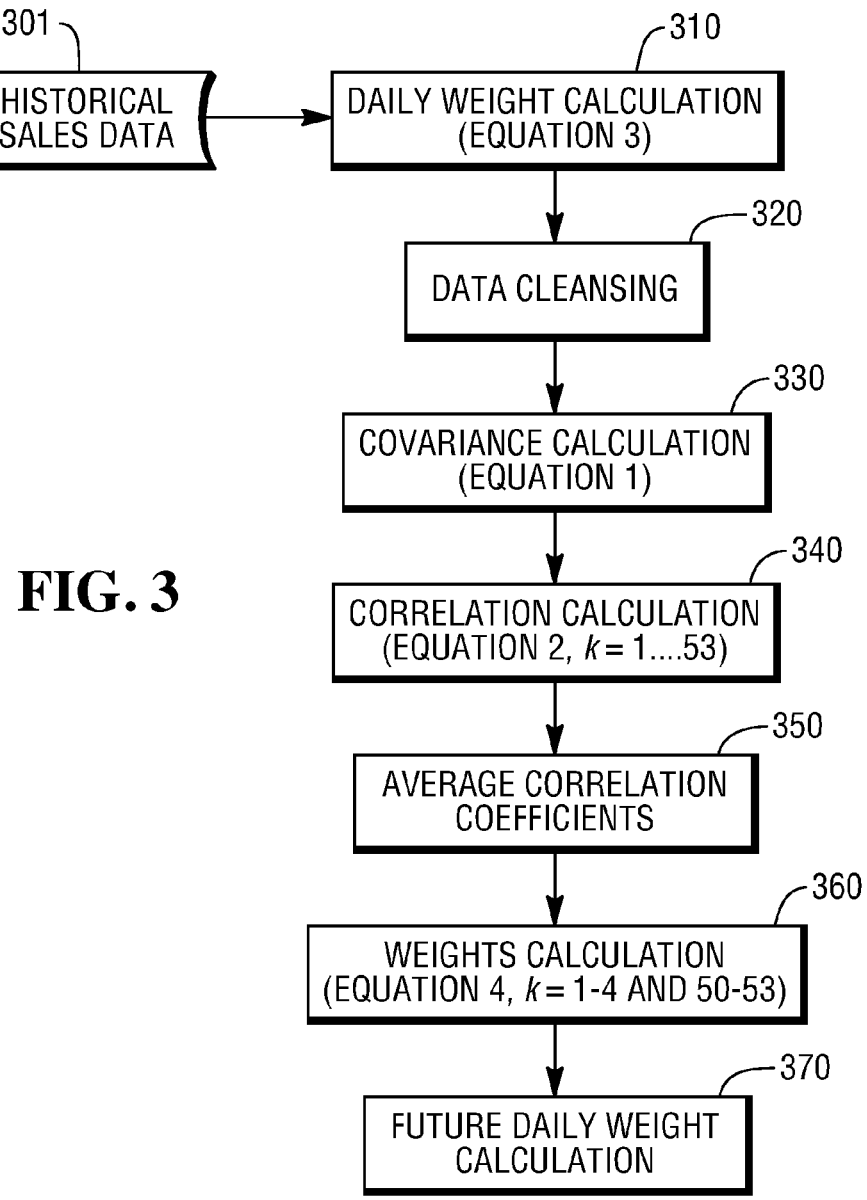
FIG. 3 provides a flow diagram for an improved system for calculating daily weights and forecasts in accordance with the present invention.

The above-described process for calculating daily weights and forecasts is illustrated in the flow diagram of FIG. 3. A minimum of one year of historical product sales data is maintained within a database 301.

The process of FIG. 3 begins in step 310 with the retrieval of historical sales data for a product from data storage and the calculation of daily weight values for the four weeks immediately prior to the week being forecast, and for four weeks one year prior to the week being forecast. In step 320 data cleansing is performed to remove product demand data corresponding to a stock-out condition, and to remove incomplete weeks, e.g., when the value of one or more variables is missing. Missing historical sales data may be replaced with average sales values from the period.

In step 330 covariance values are calculated for weeks 1 through 53 preceding the forecast week. A series of auto-covariance coefficients, $C_k$, for each day of the week, are determined using Equation (1), k=0, 1 . . . 53.

In step 340 a series of auto-correlation coefficients, $R_k$, are calculated using Equation (2), k=1 . . . 53. The average of auto-correlation coefficients for each week are calculated in step 350, as shown in Table 4. In step 360 the auto-correlation coefficients are used to calculate weights for the weighted average formula, $w_k$, of Equation (4), k=1-4 and 50-53.

Finally, in step 370 the future daily weights are determined by averaging the weighted historical daily weights for prior weeks 1-4 and 50-53.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, equivalents, and variations that fall within the spirit and broad scope of the attached claims.

What is claimed is:

1. A computer-implemented method to determine daily weight values for use in forecasting daily demand for a product during a forecast week, said method comprising the steps of:

storing within a database, implemented within a data warehouse, historical demand data for said product;

retrieving from said data warehouse, by a computer in communication with said data warehouse, historical daily demand data for said product for a period of at least one week immediately preceding said forecast week;

for each day of said at least one immediately preceding week, calculating, by said computer, a daily weight value for said product by dividing the historical daily demand for a corresponding day of said at least one immediately preceding week by a total of said historical daily demands for all seven days of said at least one immediately preceding week;

retrieving from said data warehouse historical, by said computer, daily demand data for said product for a period of at least one week one year prior to said forecast week;

for each day of said at least one year prior week, calculating, by said computer, a daily weight value for said product by dividing the historical daily demand for a corresponding day of said at least one year prior week by a total of said historical daily demands for all seven days of said at least one year prior week;

analyzing, by said computer, said historical demand data to determine weekly weighting values to be applied to said corresponding daily weight values for said at least one immediately preceding week and said at least one year prior week; and blending, by said computer, said corresponding daily weight values for said at least one immediately preceding week, said corresponding daily weight values for said at least one year prior week, and said weekly weighting values to determine a daily weight value for use in forecasting daily demand for a product.

2. The method to determine daily weight values for use in forecasting daily demand for a product during a forecast week in accordance with claim 1, wherein:

said weekly weighting values are determined through analysis of the correlation between prior daily weight values at different weeks.

3. A method to determine daily weight values for use in forecasting daily demand for a product during a forecast week, said method comprising the steps of:

storing within a database, implemented within a data warehouse, historical demand data for said product, said demand data comprising weekly and daily demand data for at least fifty-three weeks prior to said forecast week;

retrieving from said data warehouse, by a computer in communication with said data warehouse, historical daily demand data for said product for weeks one through four immediately preceding said forecast week;

for each day of said weeks one through four, calculating by said computer, a daily weight value for said product by dividing the historical daily demand for a corresponding day of said weeks one through four by a total of said historical daily demands for all seven days of said weeks one through four;

retrieving from said data warehouse, by said computer, historical daily demand data for said product for weeks fifty through fifty-three preceding said forecast week;

for each day of said weeks fifty through fifty-three, calculating, by said computer, a daily weight value for said product by dividing the historical daily demand for a corresponding day of said weeks fifty through fifty-three by a total of said historical daily demands for all seven days of said weeks fifty through fifty-three;

analyzing, by said computer, said historical demand data to determine weekly weighting values to be applied to said corresponding daily weight values for said at least one immediately preceding week and said at least one year prior week; and blending, by said computer, said corresponding daily weight values for said weeks one through four, said corresponding daily weight values for said weeks fifty through fifty-three, and said weekly weighting values to determine a daily weight value for use in forecasting daily demand for a product.

4. The method to determine daily weight values for use in forecasting daily demand for a product during a forecast week in accordance with claim 3, wherein:

said weekly weighting values are determined through analysis of the correlation between prior daily weight values at different weeks.

* * * * *